(12) United States Patent
Afferton et al.

(10) Patent No.: US 6,452,906 B1
(45) Date of Patent: Sep. 17, 2002

(54) FAULT DETECTION AND ISOLATION IN A SYNCHRONOUS OPTICAL NETWORK (SONET) AND IN A SYNCHRONOUS DIGITAL HIERARCHY (SDH) NETWORK

(75) Inventors: Thomas S. Afferton, Bridgewater; Sid Chaudhuri, East Brunswick; Peter M. Dollard, Highlands; Simon S. Zelingher, Morganville, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/137,136

(22) Filed: Aug. 20, 1998

Related U.S. Application Data

(60) Provisional application No. 60/056,495, filed on Aug. 20, 1997.

(51) Int. Cl.[7] .............................................. G01R 31/08
(52) U.S. Cl. ...................................... 370/242; 370/216
(58) Field of Search ................................ 370/242, 243, 370/244, 245, 248, 249, 250, 216, 217, 218, 219, 220, 221, 907; 359/109, 110, 111

(56) References Cited

U.S. PATENT DOCUMENTS

| 5,233,600 | A |   | 8/1993  | Pekarske ................... 370/228 |
|-----------|---|---|---------|-------------------------------------|
| 5,537,393 | A | * | 7/1996  | Shioda et al. ............... 370/223 |
| 5,636,203 | A | * | 6/1997  | Shah .......................... 370/244 |
| 5,781,535 | A | * | 7/1998  | Russ et al. ................... 370/248 |
| 6,009,075 | A | * | 12/1999 | Robert et al. ............... 370/219 |

* cited by examiner

Primary Examiner—Douglas Olms
Assistant Examiner—Brian Nguyen

(57) ABSTRACT

An in-band fault detection and isolation system and method for networks such as Synchronous Optical Network/ Synchronous Digital Hierarchy (SONET/SDH) networks. Fault detection may be quickly and efficiently performed by a network without requiring modification to any add/drop multiplexers (ADMs) and/or without the involvement of an external network management system (NMS). To accomplish this without violating SONET/SDH standards, a new signal, called a fault isolation signal in the path (FIS-P), is proposed. The FIS-P may be used in lieu of an AIS-P to support special applications on certain digital cross connect (DCS)-to-DCS path segments. Moreover, the present invention may be implemented such that the behavior, of path terminating equipment (PTE) is unaffected.

19 Claims, 3 Drawing Sheets

FAULT DETECTION AND ISOLATION IN A SYNCHRONOUS OPTICAL NETWORK (SONET) AND IN A SYNCHRONOUS DIGITAL HIERARCHY (SDH) NETWORK

The present application is based on United States provisional application Ser. No. 60/056,495, entitled "FAULT DETECTION AND ISOLATION IN A SYNCHRONOUS OPTICAL NETWORK (SONET) AND IN A SYNCHRONOUS DIGITAL HIERARCHY (SDH) NETWORK" by Thomas S. Afferton et al., filed on Aug. 20, 1997.

FIELD OF THE INVENTION

The present invention is directed generally to an in-band fault detection and isolation system and method for networks such as Synchronous Optical Network/Synchronous Digital Hierarchy (SONET/SDH) networks.

BACKGROUND

In a Synchronous Optical Network/Synchronous Digital Hierarchy (SONET/SDH) network, signal fail (SF) and signal degrade (SD) faults are detected at a SONET/SDH network element (NE) that is nearest to the fault location. Such a fault may be caused by a loss of signal (LOS), a loss of frame (LOF), or an excessive bit error rate (E-BER) in the link. According to SONET/SDH standards, the nearest pair of SONET/SDH NEs inserts an Alarm Indication Signal (AIS-P) in the failed path upon detection of a fault so that all other NEs down the signal paths are informed that there is a fault in the upstream.

Referring to FIG. 1, in a SONET/SDH network, data and overhead is transported in the format of a synchronous transport signal (STS) frame 100. Each STS frame 100 includes a synchronous payload envelope (SPE) 101 and transport overhead bytes 102. The transport overhead bytes 102 include pointers, such as pointers H1 and H2. The SPE 101 includes path overhead (POH) bytes 103, including:

Class A bytes J1 (trace byte), B3 (bit interleaving parity—8 byte), C2 (signal label byte), and G1 (path status byte);

Class B byte H4 (indicator byte);

Class C byte F2 (user channel byte); and

Class D bytes Z3 (reserved for growth and DQDB mapping) and Z4 (reserved for growth).

Additional bytes are included in the transport overhead bytes 102 and in the POH bytes 103, but these additional bytes need not be discussed herein.

In the conventional AIS-P, all of the bits in the bytes of the SPE 101 are set to one. As a result, in a conventional AIS-P, POH bytes 103 (which are a part of the SPE 101) do not carry valid information. Also, in a conventional AIS-P, both pointers H1, H2 are set to all ones (i.e., all of the bits in the pointer bytes H1 and H2 are set to one).

Referring to FIG. 2, a network 200 may include one or more SONET/SDH network elements (NEs). SONET/SDH NEs may include add/drop multiplexers (ADMs) (e.g., ADMs B, D, H), digital cross connects (DCSs) (e.g., DCSs A, K), and/or optical transport systems (OTSs) (e.g., OTSs C, E, F, G, 3). Each of the SONET/SDH NEs may be interconnected with one or more of the other SONET/SDH NEs via one or more links (e.g., links X-J, J-B, B-C, C-G, G-H, H-V, B-A, H-K, A-D, Y-F, F-D, D-E, E-Z). The network 200 may further include one or more path terminating equipment (PTE) M and/or network management system (NMS) N. The NMS M may be, for example, a computer. Although the PTE M is shown as being a separate piece of equipment, a SONET/SDH DCS can also be a PTE for some SONET/SDH signals if the SONET/SDH path terminates at the SONET/SDH DCS. FIG. 2 also illustrates SONET/SDH NEs X, Y, and Z, which may be, for example, ADMs and/or DCSs.

For purposes of illustrating how a conventional SONET/SDH network handles a conventional AIS-P, assume that a fault occurs in link A-B. In response to the fault, DCS A inserts an AIS-P on the bearer tributaries going towards ADM D (i.e., via link A-D). ADM D receives the AIS-P on its appropriate OC-N ports. Recognizing the AIS-P, ADM D passes the AIS-P through on the connected port(s) to the downstream signal path. Each ADM and DCS downstream on the signal path from ADM D also passes the AIS-P through. These downstream DCSs and ADMs do not raise alarms for the paths.

Also, on the other side of the fault in link A-B, ADM B inserts an AIS-P in the signal on link B-C towards ADM H and/or on the link B-J towards network element X. The AIS-P is received by ADM H and passed through by ADM H and then by DCS K, eventually to a PTE, which assembles the SONET/SDH path.

Thus, the PTE receives the AIS-P. In response to receiving the AIS-P, the PTE inserts the AIS into the signals on the downstream constituent link (e.g., a DS3 link, DS1 link, etc.) and may also send a SONET/SDH path failure alarm to the network management system NMS if provisioned to do so.

As a result, all NEs in the network 200 receiving the AIS-P recognize that there is a fault somewhere in the signal path. However, none of the NEs, except the pair nearest to the fault (in the above scenario, ADM B and DCA A),: can identify where the fault has occurred. Moreover, NEs do not retain any information about the location of the fault. Fault isolation is left to the NMS receiving the alarms from all NEs under its domain.

Furthermore, in some network configurations, particularly those without rings, NEs such as ADMs adjacent to the fault location are not capable of restoring the failed or degraded signal through alternate routes. Generally the task is carried out by DCSs connected to ADMs via facility-level SONET/SDH signals. If a DCS is not adjacent to the fault location, however, it must be informed by the NMS about the fault location. This method of fault isolation and dissemination of the information to the NEs for the purpose of signal restoration is time consuming and expensive.

SUMMARY OF THE INVENTION

The above-described problems are solved by implementing various aspects of the present invention. According to one aspect of the present invention, fault detection and isolation may be quickly and efficiently performed by a network without requiring modification to any add/drop multiplexers (ADMs). This is practical because ADMs already exist in many current networks. Furthermore, fault detection may be quickly and efficiently performed without the involvement of an external network management system (NMS).

According to another aspect of the present invention, the present invention may be implemented without violating any existing Synchronous Optical Network/Synchronous Digital Hierarchy (SONET/SDH) standards. To accomplish this, a new signal, called a fault isolation signal in the path (FIS-P), may be used. A FIS-P may be used in lieu of an AIS-P to support special applications on certain digital cross connect (DCS)-to-DCS path segments. A FIS-P may include an unused SONET/SDH path overhead (POH) byte that may be utilized for quickly isolating faults without the use of external monitoring systems. This byte, called a "fault isolation byte," may be any byte in the synchronous payload envelope (SPE). However, the Z4 byte (which, as discussed above, is one of the POH bytes) is an optimal choice for a fault isolation byte because the Z4 byte is completely unused by SONET/SDH for any other purpose.

According to yet another aspect of the present invention, a network may implement the present invention without changing the behavior of the path terminating equipment (PTE). This may be accomplished by implementing one or more of several variations of the present invention, as presented below. According to this aspect of the present invention, three examples of embodiments of such variations of the invention are presented below, including the "Time-Out" embodiments, the "FIS-P Termination" embodiments, and the "FIS-P/AIS-P Flip" embodiments.

Further aspects of the invention may be directed to: a method for detecting a fault in a SONET/SDH network, the method comprising the steps of receiving in a first network element a fault indication in the form of at least one of a failed signal, a degraded signal, and an AIS-P; and generating in the first network element an FIS-P in response to the step of receiving the fault indication, the FIS-P. comprising an SPE having a plurality of bytes including a plurality of POH bytes, each byte comprising a plurality of bits, wherein all of the bits in the bytes of the SPE except for at least one of the plurality of POH bytes are set to all ones.

Further aspects of the invention may be directed to: in a SONET/SDH network, a method comprising the steps of receiving by a downstream network element a signal from an upstream direction; and generating by the downstream network element a complementary FIS-P in the upstream direction responsive to receiving the signal.

Further aspects of the invention may be directed to: a network element configured to be connected in a SONET/SDH network and further. configured to generate a fault isolation signal in the path (FIS-P) in response to receiving at least one of a failed signal, a degraded signal, and an AIS-P.

Further aspects of the invention may be directed to. a network element configured to be connected in a SONET/SDH network and further configured to generate a complementary FIS-P in an upstream direction in response to receiving a signal from the upstream direction.

Further aspects of the invention may be directed to: a network element configured to be connected in a SONET/SDH network and further configured to generate an AIS-P in a downstream direction in response to receiving a complementary FIS-P from the downstream direction.

Further aspects of the invention may be directed to: a method for detecting a fault in a SONET/SDH network, the method comprising the steps of receiving in a network element a fault indication in the form of at least one of a failed signal, a degraded signal, and an AIS-P; and generating in the network element an FIS-P in response to the step of receiving the fault indication, the FIS-P being configured such that a SONET/SDH ADM receiving the FIS-P will pass the FIS-P through without detecting any change in signal status that is due to an existence of the FIS-P and a SONET/SDH DCS receiving the FIS-P will recognize an existence of a fault in the SONET/SDH network by reading the FIS-P.

Further aspects of the invention may be directed to: a digital cross connect configured to be connected in a SONET/SDH path, the SONET/SDH path having path termination equipment (PTE), the digital cross connect being configured to pass through an FIS-P in response to receiving the FIS-P if the network element is not a last DCS on the SONET/SDH path nearest to the PTE; and generate an AIS-P in response to receiving the FIS-P if the network element is the last DCS on the SONET/SDH path nearest to the PTE.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with, regard to the claimed invention.

DETAILED DESCRIPTION OF THE DRAWINGS

Figure 1:
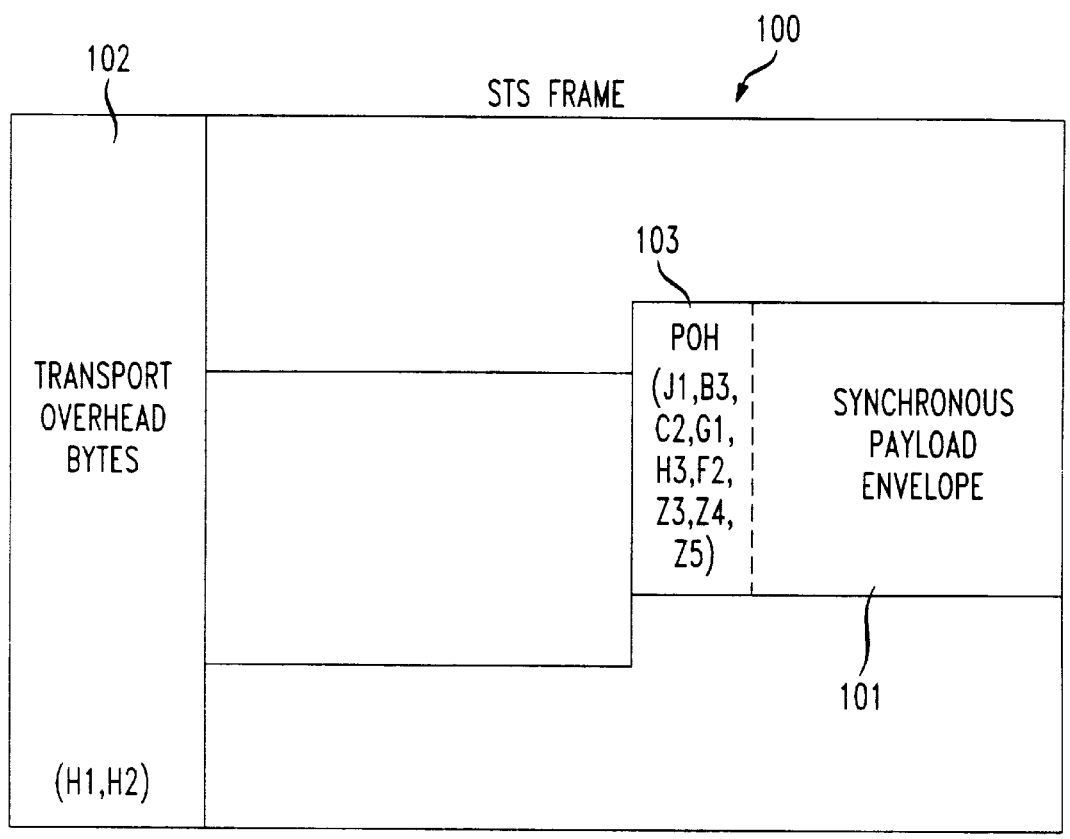
FIG. 1 illustrates the structure of a synchronous transport signal (STS) frame including a synchronous payload envelope (SPE).
Figure 2:
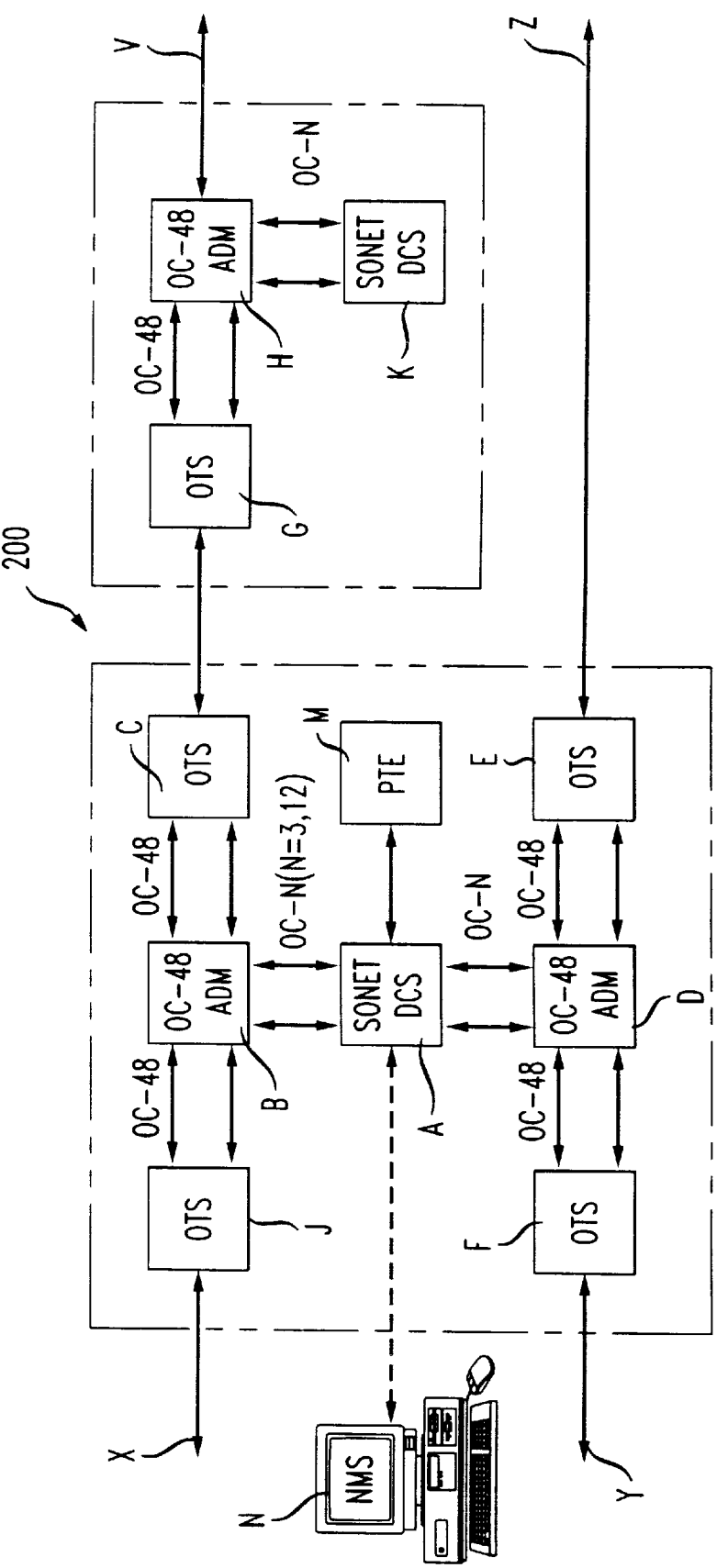
FIG. 2 illustrates a network having a plurality of interconnected Synchronous Optical Network/Synchronous Digital Hierarchy (SONET/SDH) network elements (NEs).

Referring again to FIG. 2, a network such as network 200 may be configured such that there is an add/drop multiplexer (ADM) between two digital cross connects (DCSs). For instance, ADM B is between DCS A and DCS K. If there is a fault at any location in the network 200, it is desirable to identify the fault at the nearest pair of DCSs while maintaining all of the other Synchronous Optical Network/Synchronous Digital Hierarchy (SONET/SDH) network elements (NEs) inactive (i.e. not alarmed) in association with the fault. According to SONET/SDH standards, the nearest pairs of SONET/SDH NEs insert an Alarm Indication Signal in the failed path (AIS-P). All SONET/SDH NEs receiving the AIS-P recognize that there is a fault somewhere in the upstream signal path. However, none of the SONET/SDH NEs except the nearest pair can identify where the fault has occurred.

To isolate the fault location between the nearest pair of DCSs, a fault isolation signal for the path (FIS-P) is proposed according to embodiments of the present invention. The FIS-P may have characteristics that are appropriate for preventing SONET/SDH line terminating equipment (LTE) and section terminating equipment (STE) from alarming upon receiving the FIS-P. For example, the FIS-P may have any combination of the following characteristics:

1) All of the bits in the bytes of the synchronous payload envelope (SPE) 101 of the FIS-P, except the path overhead (POH) bytes 103, may be set to one.

Thus, the non-POH part of the FIS-P would be identical to that of the AIS-P.

2) The POH bytes of the FIS-P may be as follows:
   a) Class A bytes: the J1, B3, C2, and G1 bytes are normal. In other words, the J1 and C2 bytes are the same as in the AIS-P; the B3 byte is calculated normally except with regard to an all-ones payload; and the G1 byte is set to indicate normal remote path status.
   b) Class B bytes: the H4 byte remains unchanged so that the downstream SONET/SDH NE does not see a change in the mapping specific indicator.

c) Class C bytes: the F2 byte may be used by a user and therefore it also remains unchanged.

d) Class D bytes: the Z5 byte is defined in ANSI T1.105 for tandem connection; the Z3 byte is used for distributed queue dual bus (DQDB) mapping; the only byte which is for growth (future use) and is currently completely unencumbered by SONET/SDH requirements is the Z4 byte. Thus, the Z4 byte can be used as a fault isolation byte for fault detection and isolation. In some embodiments of the invention, the fault isolation byte may be assigned :a predetermined value for the purpose of identifying the FIS-P. For example, the fault isolation byte of an FIS-P may be assigned a binary value of "10011001".

e) The FIS-P may include a Source ID (SID), which is analogous to a Path Trace, in an appropriate POH byte. The SID may identify the DCS frame at which the FIS-P was inserted.

3) The overhead transport bytes of the FIS-P may be as follows: the DCS creating the FIS-P keeps the outgoing pointer values H1, H2 unchanged before and after the fault in the path. This ensures that the receiving downstream NE does not generate a LOP-P defect by receiving a new pointer value without a new data flag (NDF). In contrast, the pointer values H1, H2 in an AIS-P are set to all ones. In fact, an all-ones pointer value is the signature of an AIS-P. Because of the all-ones pointer value, no POH exists in the AIS-P. However, because the pointer values H1, H2 remain unchanged, an FIS-P carries a valid POH.

The above-described characteristics of the FIS-P are purely illustrative, and may be different in one or more ways. For example, any byte(s) in the SPE 101 may be used as a fault isolation byte(s). However, it is preferable that the, fault isolation byte(s) be in the POH 103 and that the fault isolation byte(s) be ones that are normally unused by SONET/SDH standards (e.g., the Z4 byte as described above). Use of a byte that is currently unassigned by SONET/SDH as a fault isolation byte allows embodiments of the present invention to be implemented in a manner that is consistent with SONET/SDH standards.

Tables 1 and 2 below illustrate an example according to embodiments of the present invention of how various signals may be treated at the path layer by an ADM (which can be considered as an FIS-P transparent NE) and by a DCS (which can be considered as an FIS-P processing NE) respectively in a SONET/SDH network. According to Table 1, an ADM may be configured to: (1) insert an AIS-P in the downstream path responsive to detecting a failed and/or degraded signal; (2) pass through a received AIS-P; and/or (3) pass through a received FIS-P. In other words, an ADM need not be re-configured from its conventional configuration in order to implement embodiments of the present invention; This is because the FIS-P would not be recognized by the ADM as an indication of a fault. In contrast, a DCS may be configured according to the present invention such that the DCS may: (1) insert an FIS-P in the downstream path responsive to detecting a failed and/or degraded signal; (2) insert an FIS-P in the downstream path responsive to receiving an AIS-P from the upstream path; and/or (3) pass through a received FIS-P.

TABLE 1

ADM (FIS-P "Transparent NE")

| IN | OUT |
| --- | --- |
| failed signal and/or degraded signal | AIS-P (inserted) |
| AIS-P | AIS-P (passed through) |
| FIS-P | FIS-P (passed through) |

TABLE 2

DCS (FIS-P "Processing NE")

| IN | OUT |
| --- | --- |
| failed signal and/or degraded signal | FIS-P (inserted) |
| AIS-P | FIS-P (inserted) |
| FIS-P | FIS-P (passed through) |

Thus, according to embodiments of the present invention, a first DCS detecting a failed signal and/or degraded signal (e.g., a loss of signal (LOS), loss of frame (LOF), and/or an excessive bit error rate (E-BER)) and/or an AMS-P in an incoming signal may generate an FIS-P in the outgoing direction. A second DCS that receives the FIS-P from the first DCS may recognize the FIS-P by reading the fault isolation byte and/or may pass the FIS-P through in the outgoing direction. The second DCS may remain inactive so far as fault isolation on the failed path is concerned.

A DCS may be further configured according to various embodiments of the present invention. To avoid false detection, the DCS may be configured to check for a consistent FIS-P in three consecutive frames in conformance with other similar requirements as specified by SONET/SDH and/or equipment standards. A signal received at a service port on a DCS may be considered valid if it meets the physical and logical layer requirements for the signal level equipped/provisioned at the port. For example, it may be required that the signal is in the format of a frame. In such a case, a properly framed FIS-P would be considered valid. The DCS may be configured, for example, to support FIS-P capabilities for STS-1 tributaries in an OC-3, OC-12, and/or OC-48, for STS-3c tributaries in an OC-12 and/or OC-48 and/or for STS-12c in an OC-48. Such FIS-P capabilities of a DCS may be independently provisionable per service port, and may include, but are not limited to:

1) Detection, on each monitored service path, of status changes from/to any of the following signal conditions: (a) a valid service signal (i.e., any valid signal that is not a FIS-P or and AIS-P); (b) a FIS-P; (c) an AIS-P; and/or (d) an invalid signal.

2) Reading of the value of the SID in a received FIS-P, if provisioned to do so on the path, comparing the value of the SID against the receiving system's own SID, and/or treating any transition from/to a different (or no) SID to/from its own as a status change (e.g., as described above regarding detection of status changes).

3) Responding autonomously, if and as the receive port is provisioned to do so, to detect any designated sub-set of the status changes described above.

4) Transmitting an FIS-P from any un-cross-connected service port, either instantly upon disconnect where provisioned to do so, or in response to a command, in lieu of the standard Unequipped Channel signal (UNEQ). The default may be the standard UNEQ.

5) Inserting and FIS-P downstream on each cross-connected service path where provisioned to do so at the receive port, responsive to receipt of any received signal condition other than a valid service. signal or a valid FIS-P.

6) Re-inserting an AIS-P downstream on each, cross-connected service path, responsive to receipt of an FIS-P, where provisioned to do so at the receive port, and/or in response to a subsequent command. Otherwise, on these same ports: inserting an AIS-P downstream responsive to receipt of any invalid signal.

For the purposes of locating a fault and/or restoring a signal path from a fault, it may be sufficient to isolate the fault at the pair of DCSs nearest to the fault. In other words, it may be necessary for only the pair of DCSs nearest to the fault to have access to the fault location. However, it may be desirable to also allow other NEs on the failed signal path to have access to fault location information. Thus, according to further embodiments of the present invention, the NE that generates the FIS-P may insert an identification of itself and/or of the fault location in one or more unused POH bytes. Alternatively or additionally, the fault isolation byte may be changed by the NE that generates the FIS-P, after the FIS-P is acknowledged by a downstream NE, to identify itself and/or the fault location.

For purposes of illustration, assume that a service-affecting fault occurs somewhere in the link C-G. Due to the fault, ADM B may detect a LOS, LOF and/or an E-BER defect. According to embodiments of the present invention, ADM B may respond to such a detection by inserting an AIS-P in the bearer drop side OC-N tributaries. When DCS A receives the AIS-P, instead of passing through the AIS-P to the other side of the connection (as it would in a conventional SONET/SDH network), it generates and inserts an FIS-P as described above. Upon receiving the FIS-P, ADM D would not detect any change in the status of the SPE because the B3 is recalculated. Accordingly, ADM D would not read from nor write to any of the POH bytes 103, except that ADM D may monitor the B3 byte for intermediate path PM. The SPEI may then be mapped onto an outgoing OC-48 line and may go to another DCS Z. Upon receiving the FIS-P on the OC-N, DCS Z may read the fault isolation byte. Upon reading the fault isolation byte, DCS Z may recognize that the SPE failed somewhere on the upstream and that there is another DCS between the fault location and itself. DCS Z may then decide that no action is necessary for the failed SPE that is carrying FIS-P, and so DCS Z may transparently pass the FIS-P signal through. Thus, all DCSs downstream of the fault may receive the FIS-P, pass the FIS-P through, and remain inactive.

FIS-P identification and/or processing may also be performed as described above at the downstream ADMs and/or DCSs. If there is a fault between ADM B and DCS A, the DCS A would know the fault location and may insert an FIS-P in the connected OC-N. ADM B, however, may insert an AIS-P on the corresponding slot in the OC-48 between ADM B and ADM H. ADM H would then pass the AIS-P through to the OC-N drop to DCS K. Upon receiving the AIS-P, DCS K may recognize that there is a fault on the OC-N between itself and the next DCS upstream (DCS A). Accordingly, DCS K may insert an FIS-P in the connected outgoing OC-N. The FIS-P may be received by the path terminating equipment (PTE) where the SONET/SDH path, is assembled. The PTE may assume that the path carries a valid signal because it is not an AIS-P. However, when the PTE attempts to frame the constituent signals (DS1, DS3,; etc.), it would discover that they are all-ones signals (i.e., in the constituent signals, all of the bits in the bytes of the SPE, except the POH bytes, would be set to one). The PTE may accordingly detect a LOF defect for the constituent signals (DS3, DS1, etc.), and after a time delay (e.g., 2.5 seconds), the PTE may send an alarm(s) to the NMS. The PTE, however, may never recognize that the SONET/SDH path actually has failed somewhere upstream, and consequently would not send a path failure alarm even if it is provisioned to report a path alarm to the NMS.

In the particular embodiments of the present invention described thus far, the PTEs that terminate the failed paths may behave slightly differently as compared with how they would behave in a conventional mode of operation. Accordingly, several variations of the basic invention are proposed below for reducing and/or eliminating any difference in the behavior of the PTEs. Although many variations exist, the variations discussed below comprise the "Time-Out" embodiments, the "FIS-P Termination" embodiments, and the "FIS-P AIS-P Flip" embodiments.

"TIME-OUT" EMBODIMENTS

In some embodiments of the present invention, a DCS may insert an FIS-P when it detects a fault (if it is closest to the fault) and/or receives: an AIS-P on a SONET/SDH path. All other DCSs downstream on the SONET/SDH path may thus receive the FIS-P and/or may pass the FIS-P through. After a predetermined time-out period (e.g., between 1 and 5 milliseconds, between 5 and 10 milliseconds, or between 10 and 20 milliseconds), the DCS closest to the fault location may stop sending the FIS-P and may begin to send an AIS-P on the downstream path. The downstream DCSs may recognize the change of the signal from an FIS-P to an AIS-P and may pass the AIS-P through.

Figure 3:
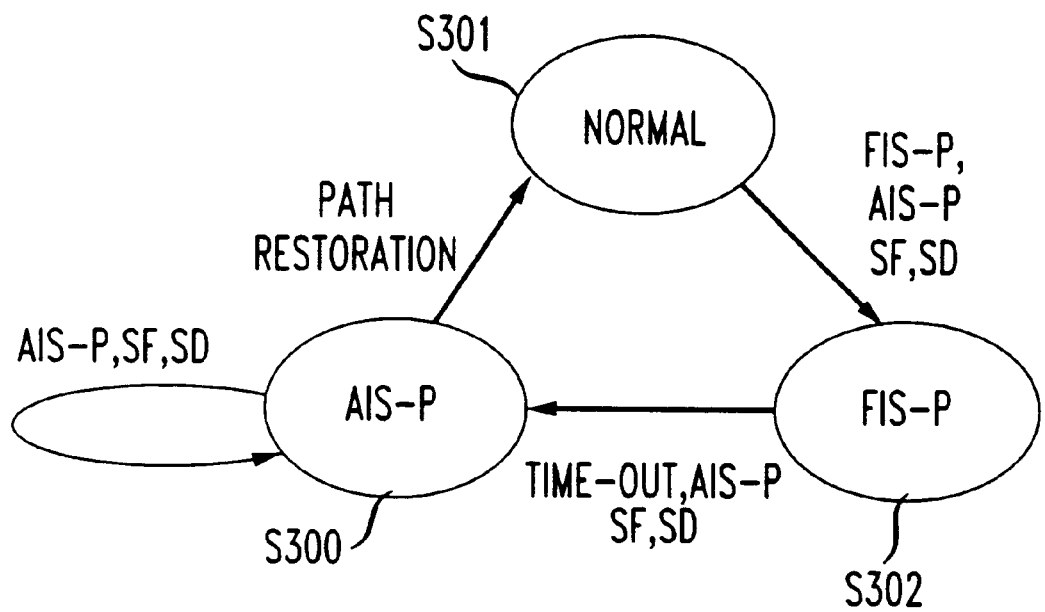
FIG. 3 is a state transition diagram of a SONET/SDH path in an FIS-P processing network element according to embodiments of the present invention.

According to some embodiments of the present invention, whether a downstream DCS inserts an FIS-P upon receiving an AIS-P from an upstream NE may depend upon whether the state of the SONET/SDH path changes from a normal state to an AIS-P or from an FIS-P to an AIS-P. Accordingly, the downstream DCSs may be configured such that the downstream DCSs would not change a received AIS-P to an outgoing FIS-P if the previous state of the signal is not normal (e.g., when the signal received immediately before the AIS-P is an FIS-P). FIG. 3 illustrates the process followed by a SONET/SDH path when a downstream DCS is so configured. According to these embodiments, a SONET/SDH path may change from a normal state (state S301) to an FIS-P state (state S302) when the path receives an FIS-P or AIS-P, and/or when the path experiences a signal failure (SF) or a signal degradation (SD). The path may further change from the FIS-P state S302 to an AIS-P state (state S300) when the path receives an AIS-P, when the path experiences an SF or an SD, and/or when a time-out occurs as discussed above. When a path has changed to an AIS-P state S300 from an FIS-P state S302, a downstream DCS would not insert an FIS-P, even if it detects a new fault, until the path goes to the normal state S301 (e.g., when the path is repaired or restored). This is shown by the closed loop connected to the AIS-P state S300.

"FIS-P TERMINATION" EMBODIMENTS

In, some embodiments of the present invention, when a path is established between two PTEs through a number of DCS and ADMs, the DC,S nearest to the PTE may be provisioned with the information that it is the last DCS on the path. In such embodiments, is when the DCS nearest to the PTE receives an FIS-P from an upstream signal, the DCS may insert an AIS-P downstream instead of passing the FIS-P through. Thus, the FIS-P would be completely confined between the pair of DCSs nearest to the two ends of a SONET/SDH path. Moreover, the PTE would behave exactly the same way as it would when connected to a network using a conventional mode of operation.

"FIS-P AIS-P FLIP" EMBODIMENTS

In some embodiments of the present invention, a DCS receiving an FIS-P may insert a complementary FIS-P in the return direction (i.e., upstream) in addition to or instead of inserting and/or passing the FIS-P through in the downstream direction. The complementary FIS-P may be the same as the FIS-P except that the fault isolation byte of a complementary FIS-P would differ from the fault isolation byte of an FIS-P according to a predetermined algorithm, thus acknowledging to the upstream DCS the receipt of the FIS-P. For instance, the fault isolation byte in the complementary FIS-P may be simply the binary complement of the fault isolation byte of the FIS-P (e.g., "01100110" is the binary complement of "10011001", wherein each one bit is changed to a zero bit and each zero bit is changed to a one bit).

Upon receiving a complementary FIS-P from the downstream direction, the DCS originally sending the FIS-P may change the FIS-P in the downstream signal to an AIS-P. If a DCS does not receive any complementary FIS-P in the return direction after a suitable waiting period after it begins to send the. FIS-P, it may assume that there is no other DCS between itself and the PTE downstream. In such a situation, the DCS may insert an AIS-P after the expiration of the waiting period. If the waiting period is less than the alarm generation waiting period (e.g., less than 2.5 seconds), the PTE would not generate a path failure alarm. Thus, the waiting period is preferably less than the alarm generation waiting period, and so the waiting period may be, for example, between 1 and 50 milliseconds, approximately 100 milliseconds, less than 100 milliseconds, between 50 and 150 milliseconds, between 150 and 250 milliseconds, less than 1 second, and/or less than 2.5 seconds.

To illustrate how the "FIS-P AIS-P Flip" embodiments may work, an example of the chronological sequence of events that may occur in network 200, where a fault occurs between ADM D and DCS A, is described as follows:

1. In response to detecting the fault, DCS A inserts an FIS-P in the corresponding outgoing SPE slot towards DCS K (i.e., via link A-B).
2. DCS K receives the FIS-P from DCS A and passes it through in the outgoing direction of the signal. DCS K also inserts a, complementary FIS-P in the return direction path towards DCS A (i.e., via link K-H).
3. DCS A receives the complementary FIS-P from DCS K and changes the FIS-P being sent towards DCS K to an AIS-P.
4. In response to receiving the AIS-P from DCS A, DCS K changes the complementary FIS-P back to a normal signal.
5. DCS K removes the FIS-P from its downstream path after it receives a complementary FIS-P from another DCS downstream or after a waiting period expires if there is no other downstream DCS.
6. The insertion and removal process continues throughout the chain of DCSs along the signal path until the last DCS, where the FIS-P is changed to MS-P only after the waiting time expires (since there are no more downstream DCSs).

Any United States patents referred to herein should be deemed to be incorporated by reference as to their entire contents.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Also, the invention described herein can be successfully used in a network regardless of whether the network is confined to a single operator's domain or encompasses multiple operators domains. Even if only a portion of a network (or a single operator's domain within a network of multiple operator's domains) is configured in accordance with the present invention, a fault may still be isolated within that portion of the network (or that operator's domain) that is configured in accordance with the present invention.

We claim:

1. A method for detecting a fault in a Synchronous Optical Network/Synchronous Digital Hierarchy (SONET/SDH) network, the method comprising the steps of:
    receiving in a first network element a fault indication in the form of at least one of a failed signal, a degraded signal, and an alarm indication signal in the path (AIS-P) associated with the fault;
    generating in the first network element a fault isolation signal in the path (FIS-P) in response to receiving the fault indication, the FIS-P comprising a synchronous payload envelope (SPE) having a plurality of bytes including a plurality of path overhead (POH) bytes, each byte comprising a plurality of bits, wherein all of the bits in the bytes of the SPE, except for at least one of the plurality of POH bytes, are set to all ones; and
    generating an AIS-P by the first network element after a predetermined period of time after beginning the step of generating the FIS-P.

2. The method of claim 1 wherein the plurality of POH bytes includes a fault isolation byte, the fault isolation byte being of a predetermined value that is not all ones such that a second network element that receives the FIS-P recognizes the FIS-P by reading at least the fault isolation byte.

3. The method of claim 2 wherein the plurality of POH bytes includes a Z4 byte, the fault isolation byte being the Z4 byte.

4. The method of claim 1 wherein the first network element is a SONET/SDH digital cross connect (DCS).

5. The method of claim 1 wherein the first network element is in a SONET/SDH path, and wherein the step of generating is performed only if the SONET/SDH path is in a normal state just prior to the step of receiving.

6. A method for detecting a fault in a Synchronous Optical Network/Synchronous Digital Hierarchy (SONET/SDH) network, the method comprising the steps of:
    receiving in a first network element a fault indication in the form of at least one of a failed signal, a degraded signal, and an alarm indication signal in the path (AIS-P) associated with the fault;
    generating in the first network element a fault isolation signal in the path (FIS-P) in response to receiving the fault indication, the FIS-P comprising a synchronous payload envelope (SPE) having a plurality of bytes including a plurality of path overhead (POH) bytes, each byte comprising a plurality of bits, wherein all of the bits in the bytes of the SPE, except for at least one of the plurality of POH bytes, are set to all ones;
    passing through the FIS-P by a second network element if the second network element is not a last digital cross connect (DCS) on the SONET/SDH path nearest to a path terminating equipment (PTE); and
    generating an AIS-P by a second network element in a downstream direction if the second network element is the last DCS on the SONET/SDH path nearest to the PTE.

7. In a Synchronous Optical Network/Synchronous Digital Hierarchy (SONET/SDH) network, a method comprising the steps of:
  receiving by a downstream network element a signal associated with a fault from an upstream direction;
  generating by the downstream network element a complementary fault isolation signal in the path (FIS-P) in an upstream direction responsive to receiving the signal associated with the fault, the complementary FIS-P comprising a synchronous payload envelope (SPE) having a plurality of bytes including a plurality of path overhead (POH) bytes, each byte comprising a plurality of bits, wherein all of the bits in the bytes of the SPE, except for at least one of the plurality of POH bytes, are set to all ones; and
  generating in an upstream network element an alarm indication signal in the path (AIS-P) in a downstream direction responsive to receiving the complementary FIS-P.

8. The method of claim 7 wherein the signal associated with the fault is an FIS-P.

9. The method of claim 8 wherein the complementary FIS-P is a binary complement of the signal.

10. The method of claim 8 wherein the signal associated with the fault is generated by an upstream network element, the method further including the step of generating in the upstream network element an alarm indication signal in the path (AIS-P) in a downstream direction responsive to an expiration of a predetermined period of time after the FIS-P is first generated.

11. The method of claim 10 wherein the predetermined period of time is less than approximately 2.5 seconds.

12. The method of claim 10 wherein the predetermined period of time is between approximately 50 milliseconds and approximately 150 milliseconds.

13. A first network element connected in a Synchronous Optical Network/Synchronous Digital Hierarchy (SONET/SDH) network, the first element network configured to generate:
  a fault isolation signal in the path (FIS-P) in response to receiving at least one of a failed signal, a degraded signal, and an alarm indication signal in the path (AIS-P); and
  an AIS-P after a predetermined period of time after beginning to generate the FIS-P,
  wherein the FIS-P comprises a synchronous payload envelope (SPE) having a plurality of bytes including a plurality of path overhead (POH) bytes, each byte comprising a plurality of bits, and all of the bits in the bytes of the SPE, except for at least one of the plurality of POH set to all ones.

14. The first network element of claim 13 wherein the plurality of POH bytes includes a fault isolation byte, the fault isolation byte being of a predetermined value that is not all ones for allowing a second network element that receives the FIS-P by reading at least the fault isolation byte.

15. The first network element of claim 13 wherein the first network element is a SONET/SDH digital cross connect (DCS).

16. The first network element of claim 13 wherein the first network element is in a SONET/SDH path, the first network element being further configured to generate the FIS-P only if the SONET/SDH path is in a normal state just prior to receiving the at least one of the failed signal, the degraded signal, and the AIS-P.

17. A method for detecting a fault in a Synchronous Optical Network/Synchronous Digital Hierarchy (SONET/SDH) network, the method comprising the steps of:
  receiving in a network element at least one of a failed signal, a degraded signal, and an alarm indication signal in the path (AIS-P);
  generating in the network element a fault isolation signal in the path (FIS-P) in response to the signal receiving step, the FIS-P being configured such that a SONET/SDH add/drop multiplexer (ADM) receiving the FIS-P will pass the FIS-P through without detecting any change in signal status that is due to an existence of the FIS-P and a SONET/SDH digital cross connect (DCS) receiving the FIS-P will recognize an existence of a fault in the SONET/SDH network by reading the FIS-P; and
  generating an AIS-P by the network element.

18. The method of claim 17 wherein the network element is a SONET/SDH digital cross connect (DCS).

19. A digital cross connect configured to be connected in a Synchronous Optical Network/Synchronous Digital Hierarchy (SONET/SDH) path, the SONET/SDH path having path termination equipment (PTE), the digital cross connect being configured to perform the steps of:
  passing through a fault isolation signal in the path (FIS-P) in response to receiving the FIS-P if the network element is not a last digital cross connect (DCS) on the SONET/SDH path nearest to the PTE; and
  generating an alarm indication signal in the path (AIS-P) in response to receiving the FIS-P if the network element is the last DCS on the SONET/SDH path nearest to the PTE,
  wherein the FIS-P comprises a synchronous payload envelope (SPE) having a plurality of bytes including a plurality of path overhead (POH) bytes, each byte comprising a plurality of bits, wherein all of the bits in the bytes of the SPE, except for at least one of the plurality of POH bytes, are set to all ones.

* * * * *